US012775775B2

(12) United States Patent
Maity et al.

(10) Patent No.: US 12,775,775 B2
(45) Date of Patent: Oct. 27, 2026

(54) CONTROL SET OPTIMIZATION FOR CIRCUIT DESIGNS BY DETECTION OF REGISTERS WITH REDUNDANT RESETS

(71) Applicant: Xilinx, Inc., San Jose, CA (US)

(72) Inventors: Sandip Maity, Bangalore (IN); Chun Zhang, San Jose, CA (US); Aman Gayasen, Hyderabad (IN)

(73) Assignee: Xilinx, Inc., San Jose, CA (US)

( * ) Notice: Subject to any disclaimer, the term of this patent is extended or adjusted under 35 U.S.C. 154(b) by 567 days.

(21) Appl. No.: 18/461,992

(22) Filed: Sep. 6, 2023

(65) Prior Publication Data

US 2025/0077760 A1 Mar. 6, 2025

(51) Int. Cl.
*G06F 30/398* (2020.01)
*G06F 111/10* (2020.01)

(52) U.S. Cl.
CPC ........ *G06F 30/398* (2020.01); *G06F 2111/10* (2020.01)

(58) Field of Classification Search
CPC ........................... G06F 30/398; G06F 2111/10
USPC ........................................................ 716/100
See application file for complete search history.

(56) References Cited

U.S. PATENT DOCUMENTS 7,979,831 B1 * 7/2011 Srinivasan ............ G06F 30/327 716/139
8,230,377 B1 7/2012 Fang
10,252,150 B1 4/2019 Kim
2011/0283250 A1 * 11/2011 Manohararajah ..... G06F 30/327 716/132
2025/0200260 A1 * 6/2025 Maity .................. G06F 30/392

OTHER PUBLICATIONS

Rezvani et al., "A Fanout Optimization Algorithm Based on the Effort Delay Model," IEEE Transactions on Computer-Aided Design of Integrated Circuits and Systems, vol. 22, No. 12 (Dec. 2003).
Kung, "A Fast Fanout Optimization Algorithm for Near-Continuous Buffer Libraries," Proceedings of Design Automation Conference (DAC) (1998).
Chen et al., "Simultaneous Gate Sizing and Placement," IEEE Transactions on Computer-Aided Design of Integrated Circuits and Systems, vol. 19, No. 2 (Feb. 2000).
Kashfi et al., "Multi-Objective Optimization Techniques for VLSI Circuits," 12th International Symposium on Quality Electronic Design (ISQED) (2011).
Altera, "Quartus II Handbook vol. 2: Design Implementation and Optimization," Chapter 12, "Timing Closure and Optimization," pp. 1-46, version 13.1 (Nov. 2013).

(Continued)

*Primary Examiner* — Suchin Parihar
(74) *Attorney, Agent, or Firm* — Kevin T. Cuenot

(57) ABSTRACT

Control set optimization for a circuit design includes generating, by a processor, Observability Don't Care (ODC) expressions for registers of the circuit design. Redundant reset pins of the registers of the circuit design are determined by the processor by iteratively checking, on a per-cube and a per-literal basis for each ODC expression, whether a value of a literal causes the ODC expression to evaluate to 1. A modified version of the circuit design is generated by the processor by connecting one or more reset pins of the set of redundant reset pins to one or more constants.

20 Claims, 8 Drawing Sheets

(56) References Cited

OTHER PUBLICATIONS

Altera, "Quartus II Handbook vol. 2: Design Implementation and Optimization," Chapter 16, "Netlist Optimizations and Physical Synthesis," pp. 1-16, version 13.1 (Nov. 2013).

Chen et al., "Timing-Driven Routing of High Fanout Nets," 21st International Conference on Field Programmable Logic and Applications (2011).

Kodandapani et al., "A Simple Algorithm for Fanout Optimization using High-Performance Buffer Libraries," 1993 IEEE/ACM International Conference on Computer-Aided Design, ICCAD-93, pp. 466-471 (1993).

Synopsys, "Synplify Premier: The Ultimate FPGA Implementation Platform," (2011).

W. Li and D. Z. Pan, "A New Paradigm for FPGA Placement Without Explicit Packing," in IEEE TCAD, vol. 38, No. 11, pp. 2113-2126, Nov. 2019.

Srihari Yechangunja, et al., "Sequential Analysis Driven Reset Optimization to Improve Power, Area and Routability," 2016 Design, Automation & Test in Europe Conference & Exhibition, pp. 551-554.

Shih-Chieh Chang, et al., "An Efficient Algorithm for Local Don't Care Sets Calculation," 32nd ACM/IEEE Design Automation Conference, 5 pages.

* cited by examiner

CONTROL SET OPTIMIZATION FOR CIRCUIT DESIGNS BY DETECTION OF REGISTERS WITH REDUNDANT RESETS

TECHNICAL FIELD

This disclosure relates to improving the Quality of Result achieved for circuit designs as implemented in integrated circuits through detection of redundant resets of registers within the circuit designs.

BACKGROUND

In complex circuit designs, reset control signals or resets are an important consideration. Reset control signals are a mechanism for forcing a circuit design, as physically realized in an integrated circuit (IC), into a known state in response to any of a variety of different conditions ranging from startup to encountering an unexpected error. Determining which registers of the circuit design require resets can be challenging given the size and complexity of modern circuit designs and ever decreasing time-to-market requirements. Since uninitialized registers can result in erroneous behavior for the circuit design, a standard design technique is for designers to apply resets to significantly more registers than required. For example, many designers start hardware description language coding with "if reset" statements without deciding whether the reset is actually needed. Typically, only a subset of registers in the circuit design requires resets.

This design tendency to use resets for more registers than are required often leads to reduced Quality of Result (QoR) in the circuit design as physically realized in an IC. The large number of registers with reset control signals results in a large number of control sets for the circuit design. A control set refers to a unique collection of control signals including a clock signal, a clock enable signal, and a reset signal for registers of a circuit design. Large numbers of control sets often result in restrictions when placing the circuit design owing to the architecture and/or capacity of the target IC. These restrictions can manifest as reduced QoR in the circuit design as realized in the target IC in the form of lower achievable clock frequency.

SUMMARY

In one or more example implementations, a method includes generating, by a processor, Observability Don't Care (ODC) expressions for registers of a circuit design. The method includes determining, by the processor, a set of redundant reset pins of the registers of the circuit design by iteratively checking, on a per-cube and a per-literal basis for each ODC expression, whether a value of a literal causes the ODC expression to evaluate to 1. The method includes generating, by the processor, a modified version of the circuit design by connecting one or more reset pins of the set of redundant reset pins to one or more constants.

The foregoing and other implementations can each optionally include one or more of the following features, alone or in combination. Some example implementations include all the following features in combination.

In some aspects, iteratively checking, on the per-cube and the per-literal basis for each ODC expression, whether a value of the literal causes the ODC expression to evaluate to 1 further includes first determining that the literal is compatible with the register of the ODC expression being processed.

In some aspects, determining the redundant reset pins of the registers of the circuit design further includes, for each ODC expression, sorting cubes of the ODC expression from largest to smallest and determining whether the ODC expression evaluates to one by checking the literals of the cubes as sorted one-by-one.

In some aspects, determining the redundant reset pins of the registers of the circuit design further includes, in response to determining that a selected literal of a selected cube of a selected ODC expression causes the selected ODC expression to evaluate to 1 and that a further ODC expression is available to process, selecting the further ODC expression for evaluating the literals thereof.

In some aspects, generating the modified circuit design includes, for reset pins of registers of a first control set that belong to the set of redundant reset pins, determining whether connecting the reset pins to the one or more constants creates a new control set. The method includes, in response to determining that the new control set is created, leaving the reset pins of the first control set unchanged.

In some aspects, generating the modified circuit design includes determining a number of registers belonging to a first control set. The method includes determining a number of registers belonging to a second control set if reset pins of registers of the first control set belonging to the set of redundant reset pins were connected to the one or more constants. The second control set is an existing control set of the circuit design. The method includes leaving the reset pins of the registers of the first control set unchanged in response to determining that the number of registers of the second control set is less than the number of registers of the first control set.

In some aspects, generating the modified circuit design includes determining a number of registers belonging to a first control set. The method includes determining a number of registers belonging to a second control set if reset pins of registers of the first control set belonging to the set of redundant reset pins were connected to the one or more constants. The second control set is an existing control set of the circuit design. The method includes connecting the reset pins of the registers of the first control set that belong to the set of redundant reset pins to the one or more constants only in response to determining that the number of registers of the second control set is greater than the number of registers of the first control set by at least a threshold margin.

In some aspects, generating the modified circuit design includes determining a number of registers belonging to a first control set. The method includes determining a number of registers belonging to a second control set if reset pins of registers of the first control set belonging to the set of redundant reset pins were connected to the one or more constants. The second control set is an existing control set of the circuit design. The method includes connecting the reset pins of the registers of the first control set that belong to the set of redundant reset pins to the one or more constants only in response to determining that the number of registers of the second control set is greater than or equal to the number of registers of the first control set.

In some aspects, a selected register of the circuit design is synchronous and at least one literal of the ODC expression for the selected register corresponds to an asynchronous register.

In one or more example implementations, a system includes one or more hardware processors configured (e.g., programmed) to execute operations as described within this disclosure.

In one or more example implementations, a computer program product includes one or more computer readable storage mediums having program instructions embodied therewith. The program instructions are executable by computer hardware, e.g., a hardware processor, to cause the computer hardware to initiate and/or execute operations as described within this disclosure.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

DETAILED DESCRIPTION

Figure 1:
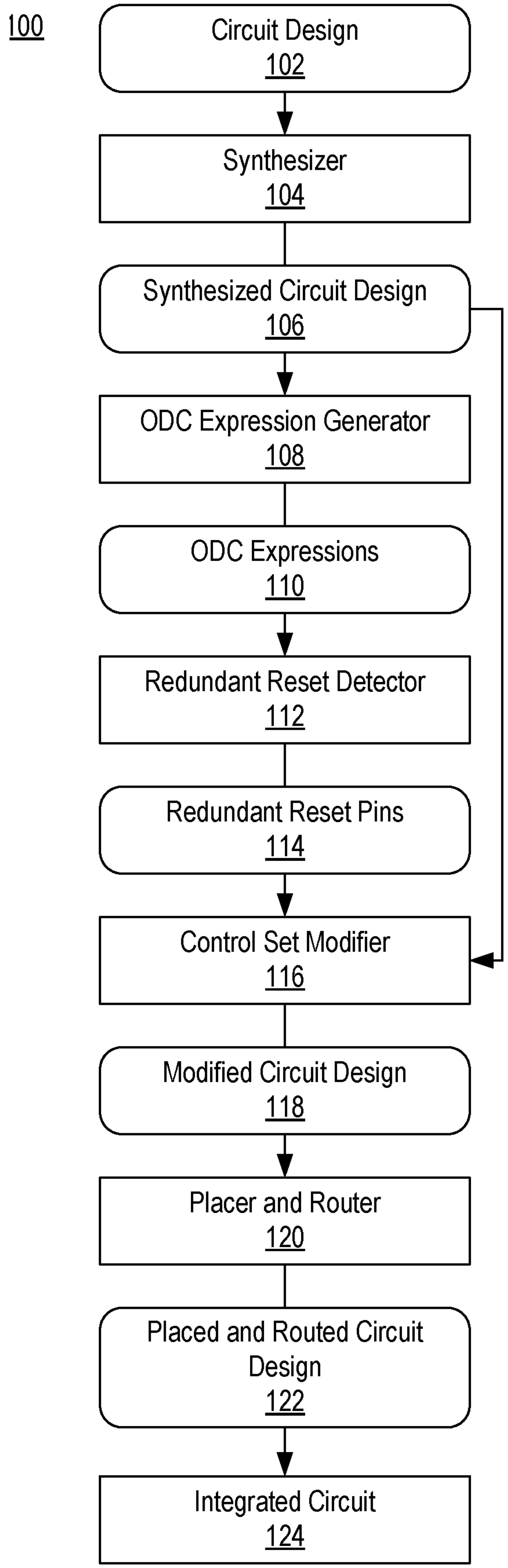
FIG. 1 illustrates certain operative features of an example system in accordance with the inventive arrangements described within this disclosure.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to improving the Quality of Result (QoR) achieved for circuit designs as implemented in integrated circuits (ICs) through detection of redundant resets of registers within the circuit designs. In one or more example implementations, a maximal number of redundant resets of registers may be detected. As discussed, a control set refers to a unique collection of control signals including a clock (CLK) signal, a clock enable (CE) signal, and a reset signal for registers of a circuit design. A reset signal may include a set signal, a reset signal, a clear signal, and a preset signal. A unique combination of CLK, CE, and reset signals forms a unique control set. An IC may have an architecture that imposes certain limitations as to the number of different control sets that may be included within a given component of the IC. These limitations may vary from one model and/or type of IC to another.

As an illustrative and non-limiting example, an IC, e.g., a programmable IC, may have an architecture that includes a plurality configurable logic blocks (CLBs). Each CLB includes one or more slice components. Each slice component, in turn, includes a fixed number of registers or register sites to which registers of a circuit design may be assigned (e.g., placed). The IC may have a restriction as to the number of registers of different control sets that may be assigned to a same slice component. For purposes of discussion, consider an example in which a slice component of the IC is able to include only registers that belong to the same control set.

In this example, one can see that having a large number of control sets in a circuit design may reduce the ability of the implementation tools to place the circuit design for the IC. Once the implementation tools place a register of the circuit design to a given slice component, other registers of the circuit design that belong to different control sets may not be placed in that same slice component. This can significantly limit the available sites to which registers may be placed. In consequence, the implementation tools may be forced to relocate registers to different slice components at different locations on the target IC to achieve a legal placement. This can lead to larger distances between components of the circuit design as placed, which requires more routing resources and leads to longer net delays (e.g., reduced QoR manifested as lower operating frequencies). Further, the implementation tools may be forced to leave certain register sites of the IC empty, which wastes resources of the IC (e.g., reduced QoR as circuit designs require larger ICs for implementation).

The inventive arrangements provide methods, systems, and computer program products that are capable of detecting redundant resets for registers in circuit designs. In some examples, "Observability Don't Care" (ODC)-based techniques are adapted to detect redundant resets. For a given circuit design, the inventive arrangements are capable of detecting a larger number of redundant reset signals than other conventional ODC redundancy detection techniques. As noted, in particular example implementations, the inventive arrangements are capable of detecting a maximal number of redundant reset signals. With a larger number of redundant reset signals having been detected for a circuit design, the implementation tools are capable of processing the circuit design to optimize the number of control sets therein by a larger degree than otherwise would have been the case. In one or more examples within this disclosure, the optimization of control sets includes a reduction in the number of control sets of the circuit design and/or an increase the number of members in one or more control sets (which may include a reduction in the number of members of other control sets). Having optimized the number of control sets in the circuit design by removing the redundant resets, the resulting QoR of the circuit design as physically realized (e.g., implemented) in an IC is increased. The increase in QoR may manifest in one or more ways such as, for example, achieving a higher operating frequency for the resulting IC and/or improved resource utilization of the IC resources such that the IC may implement a larger circuit design than otherwise would have been the case.

The inventive arrangements described within this disclosure may be used on circuit designs that are implemented in programmable ICs and on circuit designs that are implemented using Application-Specific ICs (ASICs). A programmable IC is an IC that includes at least some programmable circuitry. Programmable logic is a type of programmable circuitry. An example of a programmable IC is a Field Programmable Gate Array (FPGA). In the case of a programmable IC such as an FPGA, modifications to the circuit design based on detected redundant resets may be performed subject to particular heuristics that account for changes in the number and/or size of control sets of the circuit design. The heuristics may account for the underlying and fixed architecture of the FPGA.

The term "control set" means two or more control pins of two or more different circuit components that are of a same control pin type where the control pins of same type are driven by same control signals. Two circuit components are in a same control set when each of the two circuit components has same control pin types (e.g., CLK, CE, reset) driven by same respective control signals.

Further aspects of the inventive arrangements are described below with reference to the figures. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

FIG. 1 illustrates certain operative features of an example system in accordance with the inventive arrangements described within this disclosure. FIG. 1 illustrates an example of a framework 100 that is executable by a data processing system, e.g., a computer, to perform the various operations described within this disclosure. A data processing system executing suitable operational software such as, for example, framework 100, is an example of an Electronic Design Automation (EDA) system. An example of a data processing system, e.g., computer, that may be used to execute framework 100 is described in connection with FIG. 8.

In the example, framework 100 includes a synthesizer 104, an ODC expression generator 108, a redundant reset detector 112, a control set modifier 116, and a placer and router 120. Framework 100 may include additional executable program code (not shown) for performing other operations described herein.

Figure 2:
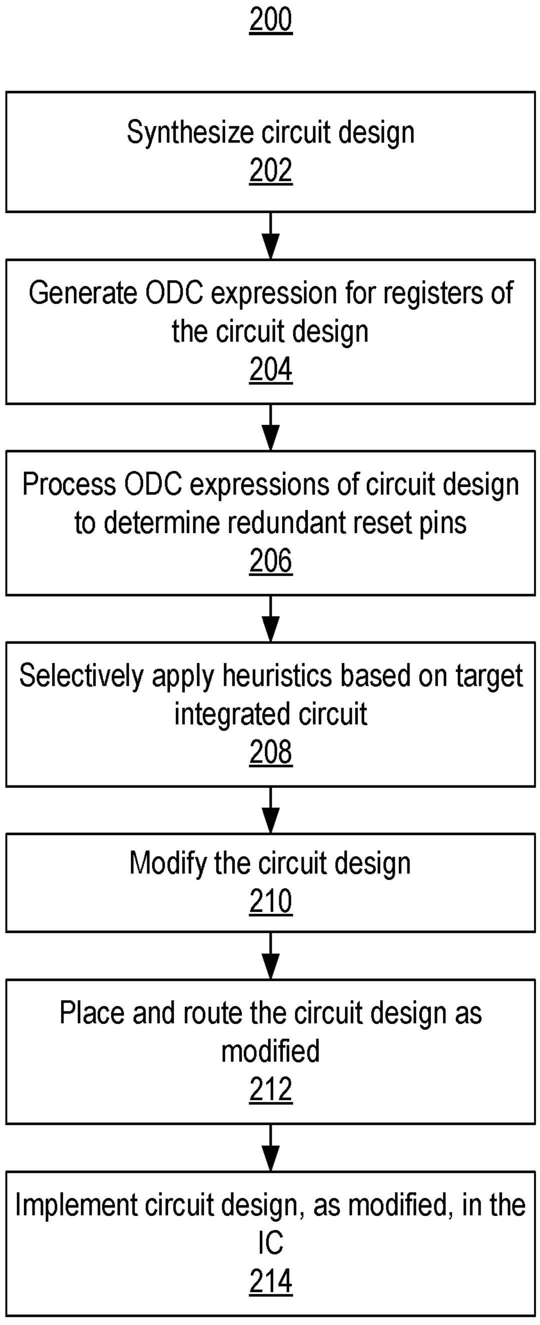
FIG. 2 illustrates an example method of processing a circuit design for implementation in an integrated circuit (IC) as performed by a system executing the framework of FIG. 1.

FIG. 2 illustrates an example method 200 of processing circuit design 102 for implementation in an IC 124 as performed by a system executing framework 100 of FIG. 1. Referring to FIGS. 1 and 2 collectively, in block 202, synthesizer 104 synthesizes circuit design 102 to generate synthesized circuit design 106. An example of a synthesized circuit design is a gate-level netlist.

Circuit design 102 may be specified as one or more register transfer level (RTL) description modules. Circuit design 102 may refer to an entire circuit design that includes user specified RTL; one or more cores and/or intellectual properties (IPs); a combination of user specified RTL, cores, and/or IP; a single IP and/or core (e.g., a reusable portion of RTL); or the like. The term "module" means a unit of RTL. A module may be defined within the syntax of the particular hardware description language (HDL) used to express the RTL description and may be part of a hierarchical organization of modules forming the circuit design.

In block 204, the system generates ODC expressions 110 for registers of the circuit design. For example, synthesized circuit design 106 may be provided to ODC expression generator 108 that is capable of generating ODC expressions 110 for registers connected to different components of circuit design 102. In one aspect, ODC expression generator 108 generates an ODC expression for each register of synthesized circuit design 106. As generally known, ODC expressions 110 are generated as Boolean conditions expressed in terms of signals of a circuit design. An ODC expression specifies the observability of any signal in a circuit design (e.g., RTL) as a Boolean expression under which the corresponding signal's value becomes observable or influences the value of one or more outputs of the circuit design. An ODC expression for a signal (e.g., as output from a circuit component) specifies the condition under which the signal's value has no impact on any of the circuit design's outputs.

Consider an example in which a circuit includes a register F that outputs a signal F used in some function to generate a network output of Z (e.g., signal Z) from the circuit. The network output Z is insensitive to the internal signal F when values of inputs to Z make the cofactors $Z(F=0)==Z(F=1)$. The values may be found by solving the expression $Z(F=0)\overline{\oplus}Z(F=1)==1$, which uses the exclusive NOR equality gate between the two cofactors. The expression also may be rewritten as $\overline{[Z(F=0)\oplus Z(F=1)]}==1$, which uses an exclusive OR between the two cofactors with the complement taken over the entire left portion of the expression. Based on these expressions, it can be said that when the expression $$\frac{dZ}{dF}$$

evaluates to 1, the output Z is said to be sensitive to signal F. The ODC expression of register F is determined as the complement of $$\frac{dZ}{dF}$$

written as $$\left(\frac{dZ}{dF}\right)'.$$

When the ODC expression of signal F, $$\left(\frac{dZ}{dF}\right)',$$

evaluates to 1, the output Z is said to be insensitive to the signal F.

Figure 3:
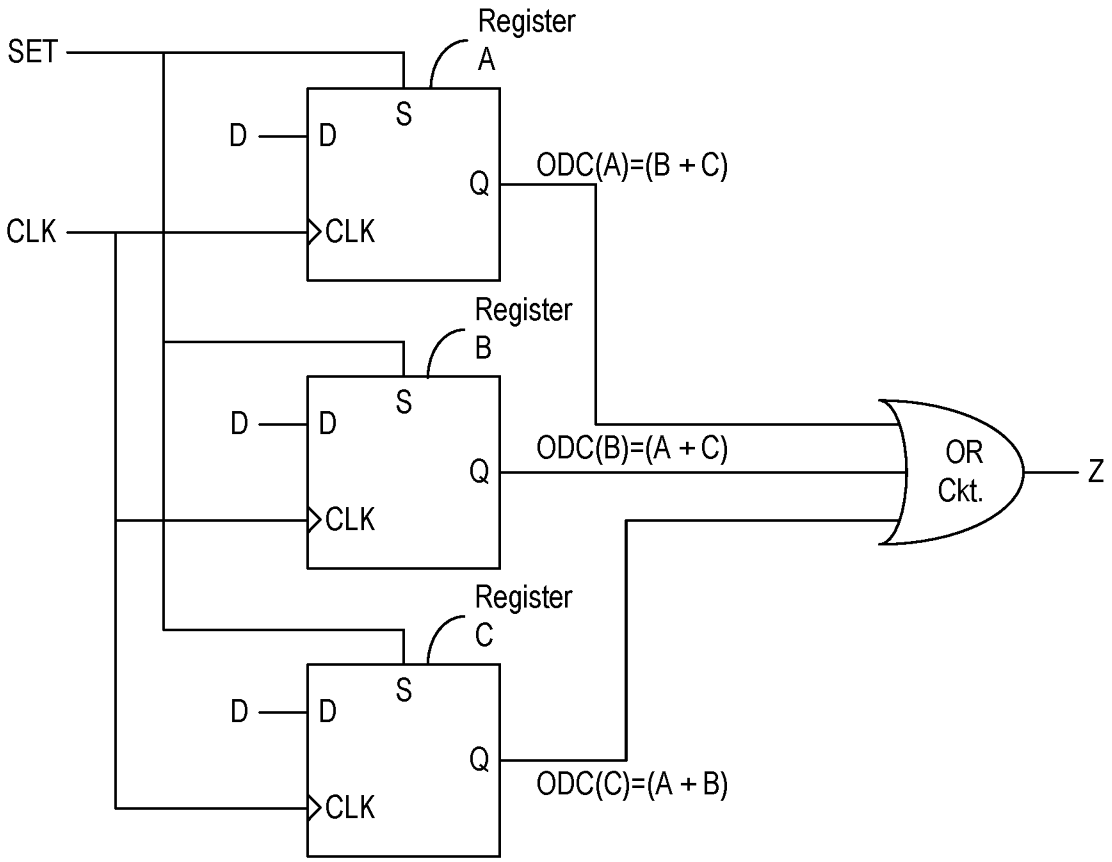
FIG. 3 illustrates an example of a circuit design for which Observability Don't Care (ODC) expressions may be generated.

FIG. 3 illustrates an example of a circuit design such as circuit design 102 for which ODC expressions may be generated. In the example an ODC expression is generated for each of registers A, B, and C. The ODC expression of register A may be expressed as ODC(A)=(B+C). The ODC expression of register A indicates that if either one or both of registers B and C outputs a value of 1, the value of register A is masked and has no effect on the value of Z as output from the OR circuit. In this example, it can be seen that if the set signal of either one or both of registers B and C is set, then the value output from register A is masked with respect to output Z.

Similarly, it may be seen that if the output of register A has a value of 1 (e.g., the set signal to register A is asserted), then the values output from registers B and C become don't cares. That is, the value of output Z is completely independent of the value output from register B and register C. For purposes of illustration, the ODC expression of register B may be expressed as ODC(B)=(A)+(C). The ODC of register C may be expressed as ODC(C)=(A)+(B). These ODC expressions also may be solved for values of the constituent signals that render each expression equal to 1.

Figure 4:
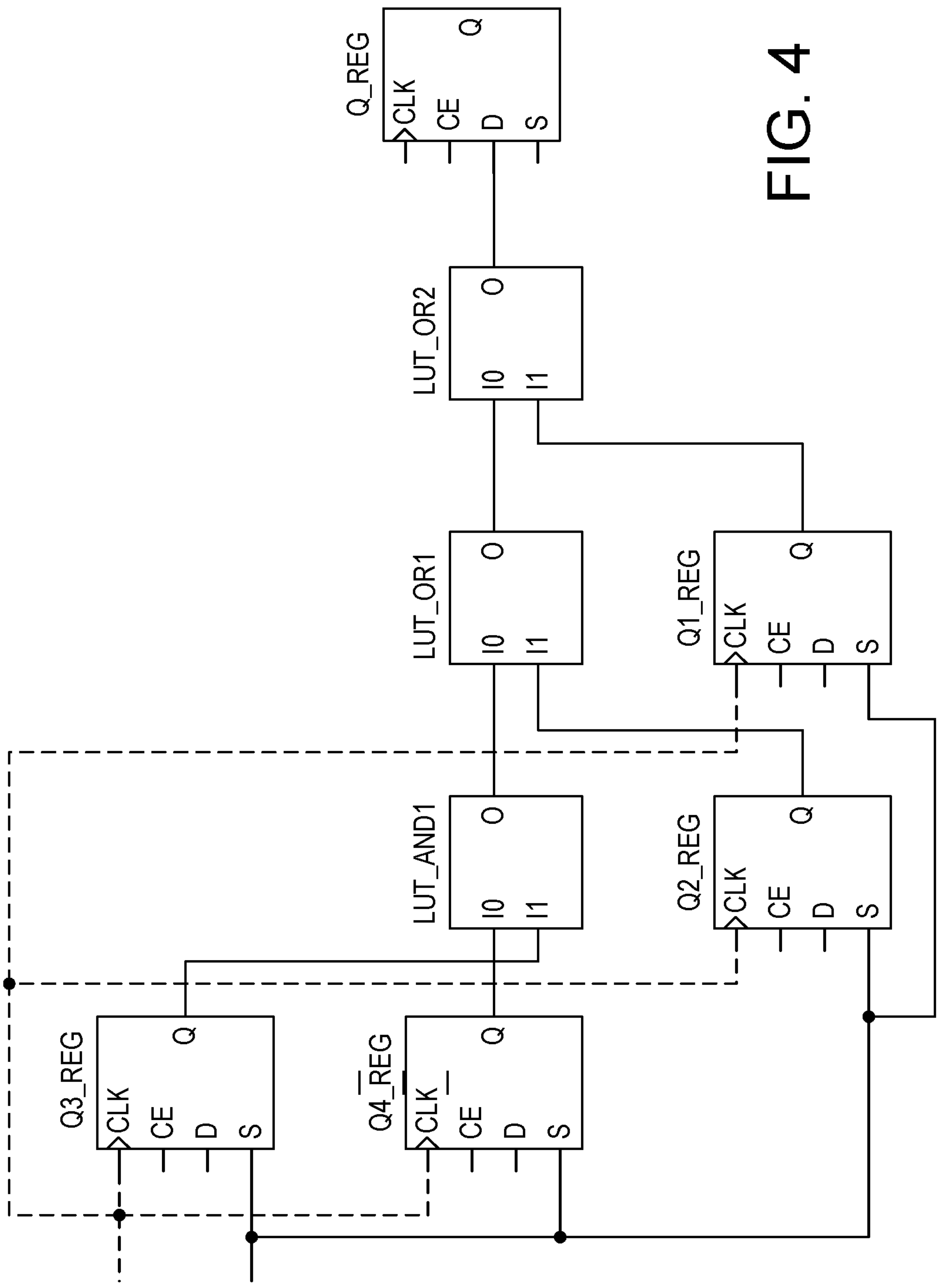
FIG. 4 illustrates another example of a circuit design for which ODC expressions may be generated.

FIG. 4 illustrates another example of a circuit design such as circuit design 102 for which ODC expressions may be generated. In the example, the circuit design includes a plurality of different registers shown as Q_REG, Q1_REG, Q2_REG, Q3_REG, and Q4_REG. The example circuit also includes lookup tables (LUTs) illustrated as LUT_AND1 (e.g., implementing a logical AND function), LUT_OR1 (e.g., implementing a logical OR function), and LUT_OR2 (e.g., implementing another logical OR function). As illustrated, Q1_REG, Q2_REG, Q3_REG, and Q4_REG are considered to be compatible, as discussed in greater detail below, as each is driven by a same CLK signal, each has a same reset signal, and each is of a same synchronization type (e.g., S). For purposes of illustration, the ODC expression of register Q1_REG that indicates whether the network output Z is sensitive to Q1_REG is (Q2_REG+Q3_REG.Q4_REG).

The generation of ODC expressions for components of a circuit design such as registers is a practice that is well understood by those skilled in the art and that may be performed by any of a variety of available EDA-based circuit design implementation and/or analysis tools.

In block 206, the system processes the ODC expressions 110 of circuit design 102 to determine whether the registers have redundant reset pins. For example, redundant reset detector 112 is capable of detecting redundant reset pins of registers in the circuit design by analysis of ODC expressions 110. In one or more example implementations, redundant reset detector 112 is capable of iteratively checking, on a per-literal basis (e.g., checking literals one-by-one) and on a per-cube basis (e.g., checking cubes one-by-one) for each ODC expression, whether a value of a literal causes the ODC expression to evaluate to 1. Further details as to the particular implementation of block 206 are provided in connection with FIG. 5. Redundant reset detector 112 outputs a set of one or more redundant reset pins 114.

In one or more examples, redundant reset detector 112 is capable of detecting a maximal number of redundant reset pins in the circuit design. Conventional approaches are unable to identify many of the redundant reset pins in the circuit design. For example, when a reset pin of a register is asserted to make an ODC expression evaluate to 1, removal of the reset of that register may not be considered. The register is skipped or excluded from further processing.

Referring to the example of FIG. 4, conventional approaches attempt to evaluate the ODC expression for Q1_REG by substituting for every register driven support of the ODC expression (the registers which have same reset domain as the target register Q1_REG) by their respective reset values. That is, conventional approaches consider all of the literals whose respective driver register has the same reset domain as the target register for substitution by their reset values in the ODC expression. Thus, in the case of FIG. 4, for example, a conventional approach would assert all of the registers Q2_REG, Q3_REG, and Q4_REG. Each of these registers would then be excluded from further processing (e.g., to determine whether such registers have redundant resets).

In accordance with the inventive arrangements described herein, and as illustrated in greater detail in connection with FIG. 5, redundant reset detector 112 skips or excludes a lesser number of asserted registers from further processing. Skipping fewer asserted registers increases the likelihood that a larger number of redundant reset pins will be detected. For example, in accordance with the inventive arrangements described herein, the ODC expression is evaluated incrementally by asserting as few registers as possible, so that fewer registers are skipped or excluded from further processing. In the example of the ODC expression for the Q1_REG of FIG. 4, redundant reset signal detector 112 would assert only register Q2_REG to ensure that the register Q1_REG has a redundant reset, which leaves registers Q3_REG and Q4_REG available for further processing (e.g., testing whether such registers have redundant resets).

Conventional approaches also are unable to process mixed sync-type registers in the ODC expressions. The "sync-type" of a register refers to whether the register is synchronous or asynchronous. Since conventional approaches check that the reset domain of registers is identical (allow only assertion of synchronous registers for synchronous target registers), conventional approaches may fail to evaluate some ODC expressions as 1. The inventive arrangements described within this disclosure allow assertion of asynchronous register(s) for a synchronous target register, which may increase the number of identified redundant resets.

In block 208, the system, e.g., control set modifier 116, selectively applies one or more heuristics to the set of redundant reset pins 114. The heuristics may be applied based on the particular type of IC in which the circuit design will be physically realized. For example, in the case where circuit design 102 is to be implemented in an ASIC, control set modifier 116 does not apply the heuristics. In the case where circuit design 102 is to be implemented in a programmable IC such as an FPGA, control set modifier 116 does apply the heuristics. Application of the heuristics by control set modifier 116 is described in greater detail in connection with FIG. 6.

In block 210, the system is capable of modifying the circuit design. That is, control set modifier 116 is capable of assigning one or more constants (e.g., values of 1 or 0 corresponding to VDD or ground, respectively) to the set of redundant reset pins 114 to generate modified circuit design 118. Modified circuit design 118 is another version of circuit design 102 and/or synthesized circuit design 106. Modified circuit design 118 is functionally equivalent to circuit design 102 and/or synthesized circuit design 106 albeit having been optimized with respect to control sets for improved QoR.

It should be appreciated that in the case where the heuristics are not applied, each reset pin of the set of one or more redundant reset pins 114 may be processed as described in block 210. In the case where heuristics are applied, it may be the case that only a subset of the reset pins from set of redundant reset pins 114 is processed as described in block 210. That is, application of the heuristics causes the modifications to be selectively applied to the set of redundant reset pins 114.

In block 212, the system is capable of placing and routing the circuit design as modified in block 210. As illustrated in FIG. 1, modified circuit design 118 may be provided to a placer and router 120 (e.g., collectively illustrated as block 120) to generate a placed and routed circuit design 122. Placed and routed circuit design 122 is placed and routed as modified by way of the control set optimization operations performed by control set modifier 116. As discussed, control set optimization, whether a reduced number of control sets or a same number of control sets with one or more of the control sets having an increased number of members allows for a more efficient placement and/or routing of the circuit design thereby increasing the QoR of the circuit design as physically realized in the IC.

In block 214, the system is capable of implementing placed and routed circuit design 122 in IC 124. That is, placed and routed circuit design 122 is physically realized within IC 124. Implementing placed and routed circuit design 122 may include manufacturing or fabricating IC 124 (e.g., where IC 124 is an ASIC) that implements placed and routed circuit design 122. In the case where IC 124 is a programmable IC such as an FPGA, implementing placed and routed circuit design 122 may include generating configuration data and loading that configuration data into IC 124, which physically realizes placed and routed circuit design 122 within IC 124.

Though not illustrated, it should be appreciated that any of a variety of different optimizations may be performed by the system on the circuit design at various stages of the design flow illustrated in FIGS. 1 and 2. In this regard, FIGS. 1 and 2 are not intended to be limitations on the particular design flow that may be implemented, but rather are provided as an example context in which the ODC-based control set optimization techniques described herein may be implemented.

Figure 5:
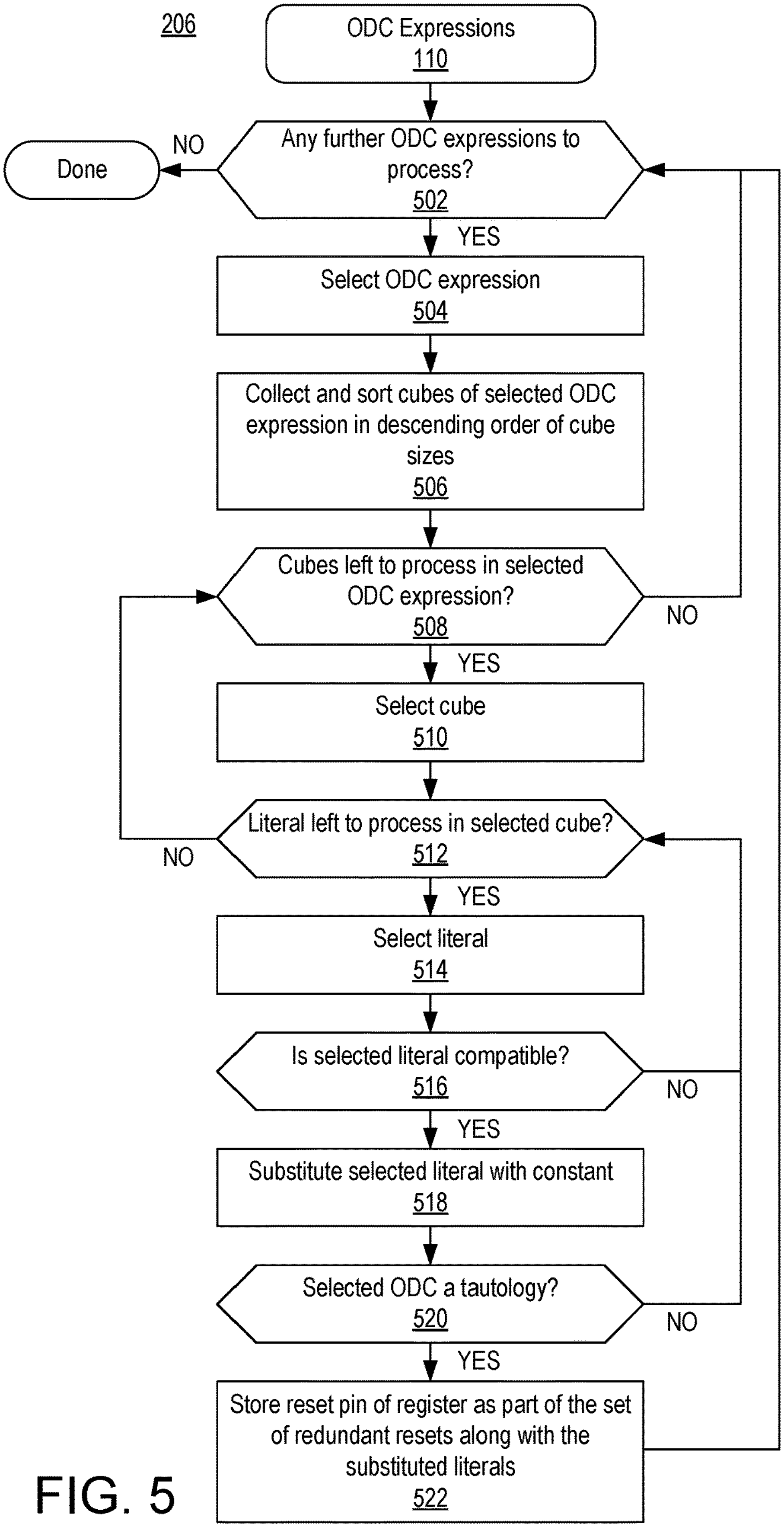
FIG. 5 illustrates an example implementation of ODC expression processing as generally described in block 206 of FIG. 2.

FIG. 5 illustrates an example implementation of the ODC processing performed by redundant reset detector 112 as generally described in block 206 of FIG. 2. As illustrated, redundant reset detector 112 obtains ODC expressions 110 as generated by ODC expression generator 108. In block 502, redundant reset detector 112 determines whether there are any further ODC expressions left to process. In response to determining that no further ODC expressions remain to be processed, the method may end (e.g., block 206 may end so that processing in FIG. 2 continues to block 208). In response to determining that one or more ODC expressions remain to be processed, the method continues to block 504.

In block 504, redundant reset detector 112 selects an ODC expression to be processed. In block 506, redundant reset detector 112 collects the cubes of the selected ODC expression. Further, redundant reset detector 112 sorts the cubes of the selected ODC expression in decreasing order of their sizes. The term "cube" refers to a product term of the ODC expression. For purposes of illustration, an ODC expression such as (Q2_REG+Q3_REG.Q4_REG) for Q1_REG from the example of FIG. 4 has the cubes "Q2_REG" and "Q3_REG.Q4_REG". In terms of sorting, the largest cube is the cube with a single literal, while the next smaller cube is one with two literals, followed by the cube with 3 literals, and so forth. Thus, in the example of ODC(Q1_REG)=(Q2_REG+Q3_REG.Q4_REG), the cubes are already in decreasing order. The processing illustrated in FIG. 5 progresses from largest cube to smallest cube on a per-ODC expression basis.

In block 508, redundant reset detector 112 determines whether there are any further cubes of the selected ODC expression left to process. In response to determining that no further cubes remain to be processed in the selected ODC expression, the method loops back to block 502 to end or select a next ODC expression for processing. In response to determining that the selected ODC expression has one or more cubes remaining to process, the method continues to block 510 where the next smaller cube is selected. As discussed, in the example where the selected ODC expression is ODC(Q1_REG)=(Q2_REG+Q3_REG.Q4_REG), the cube "Q2_REG" is selected first, followed by the cube "Q3_REG.Q4_REG."

In block 512, redundant reset detector 112 determines whether there are any literals remaining to be processed in the selected cube. In response to determining that no further literals are left to process in the selected cube, the method loops back to block 508 to select a next cube if one remains for the selected ODC expression or loops back again to block 502. In response to determining that one or more literals are left to process in the selected cube, the method continues to block 514 to select a literal of the selected cube. In this example, redundant reset signal detector 112 selects literal Q2_REG since the cube includes only a single literal.

In block 516, redundant reset detector 112 determines whether the selected literal is compatible. More particularly, redundant reset detector 112 determines whether the register corresponding to the selected literal is compatible with the register to which the selected ODC expression corresponds. Compatibility, as determined by redundant reset detector 112, is based on a determination of whether the clock signals, the reset signals, and an evaluation of the synchronization types of the register corresponding to the selected literal and the register to which the selected ODC expression corresponds.

In this example, redundant reset detector 112 determines whether Q1_REG (the register to which the ODC expression corresponds) and Q2_REG (the register of the selected literal) are driven by a same clock signal and have the same reset signal. In this example, both registers have the same clock signal (e.g., the same signal is distributed to the clock pin of Q1_REG and Q2_REG in FIG. 4) and both registers have the same reset signal (e.g., the same signal is distributed to the reset pin of Q1_REG and Q2_REG in FIG. 4). Further, both registers Q1_REG and Q2_REG have compatible synchronization types. Examples of compatible synchronization types include both registers have a same synchronization type whether both are synchronous or both are asynchronous. Further, compatible synchronization types include the case where Q1_REG (the register of the ODC expression) is synchronous and Q2_REG (the register of the literal of the ODC expression) is asynchronous. It should be appreciated that if, for example, Q1_REG (the register of the ODC expression) were asynchronous and Q2_REG (the register of the literal of the ODC expression) were synchronous, the two registers would not be considered compatible and would not be evaluated.

For purposes of illustration, each register of the example of FIG. 3 is a synchronous register having a reset pin "S." Thus, any combination of ODC expression and literals will be considered compatible as each register has the same synchronization, the same clock signal, and the same reset signal. If, however, register B and register C were asynchronous with preset type reset pins, different situations arise. For example, consider the case where redundant reset detector 112 selects the ODC expression for register A first. In that case, the pair of registers A (synchronous register for the selected ODC expression) and B (asynchronous register and literal of selected ODC expression) is compatible and the pair of registers A (synchronous register for the selected ODC expression) and C (asynchronous register and literal of the selected ODC expression) is compatible. In another example where redundant reset detector 112 selects the ODC expression for register B first, the pair of registers B (asynchronous register for the selected ODC expression) and A (synchronous register and literal of the selected ODC expression) is not compatible while the pair of registers B (asynchronous register for the selected ODC expression) and C (asynchronous register and literal of the selected ODC expression) is compatible.

In block 518, redundant reset detector 112 substitutes the value of the selected literal in the selected ODC expression with a constant (e.g., a value of 0 or 1). For example, if the register is of a reset type (e.g., FDRE or FDCE), redundant reset detector 112 substitutes a value of 0. If the register is of a set type (e.g., FDSE or FDPE), redundant reset detector 112 substitutes a value of 1.

In block 520, redundant reset detector 112 determines whether the ODC expression is a tautology (e.g., whether the ODC expression evaluates to 1). In response to determining that the selected ODC expression is a tautology, the method continues to block 522, where the reset pin of the register for the ODC expression is added to the set of redundant reset pins 114. Further, the substituted literals (e.g., the constants for the substituted literals) are stored with the reset pin of the register. In this case, no further processing of literals in the selected ODC expression is necessary. In this particular example, in response to determining that the ODC expression of the selected register Q1_REG evaluates to 1 in block 520, the reset pin of Q1_REG is added to set of one or more redundant reset pins 114. In response to determining that the selected literal does not cause the selected ODC expression to evaluate to 1, the method loops back to block 512 to process any remaining literals of the selected cube in the selected ODC expression.

The example of FIG. 5 illustrates a greedy approach that starts with the biggest cube and progresses to the smallest cube. The approach substitutes the register driven literals of the cube by their respective reset values until the expression becomes a tautology. Accordingly, the method illustrated in FIG. 5 may continue operating on a per-ODC expression basis, on a per-cube basis, and on a per-literal basis as described. The example processing described in the example of FIG. 5 is capable of detecting a larger number, e.g., more, redundant reset signals compared to other known redundant signal detection techniques. For example, other existing techniques check different ODC expressions by asserting all literals of that ODC expression concurrently to detect a tautology. This approach often misses a significant number of redundant reset pins compared to the technique illustrated in FIG. 5 that compares each cube of each ODC expression and each literal of each cube. By detecting a larger number of redundant reset pins in a circuit design, control set modifier 116 is capable of implementing a greater level of control set optimization resulting in placed and routed circuit design 122 having a higher QoR and having a higher QoR as physically realized in IC 124.

Figure 6:
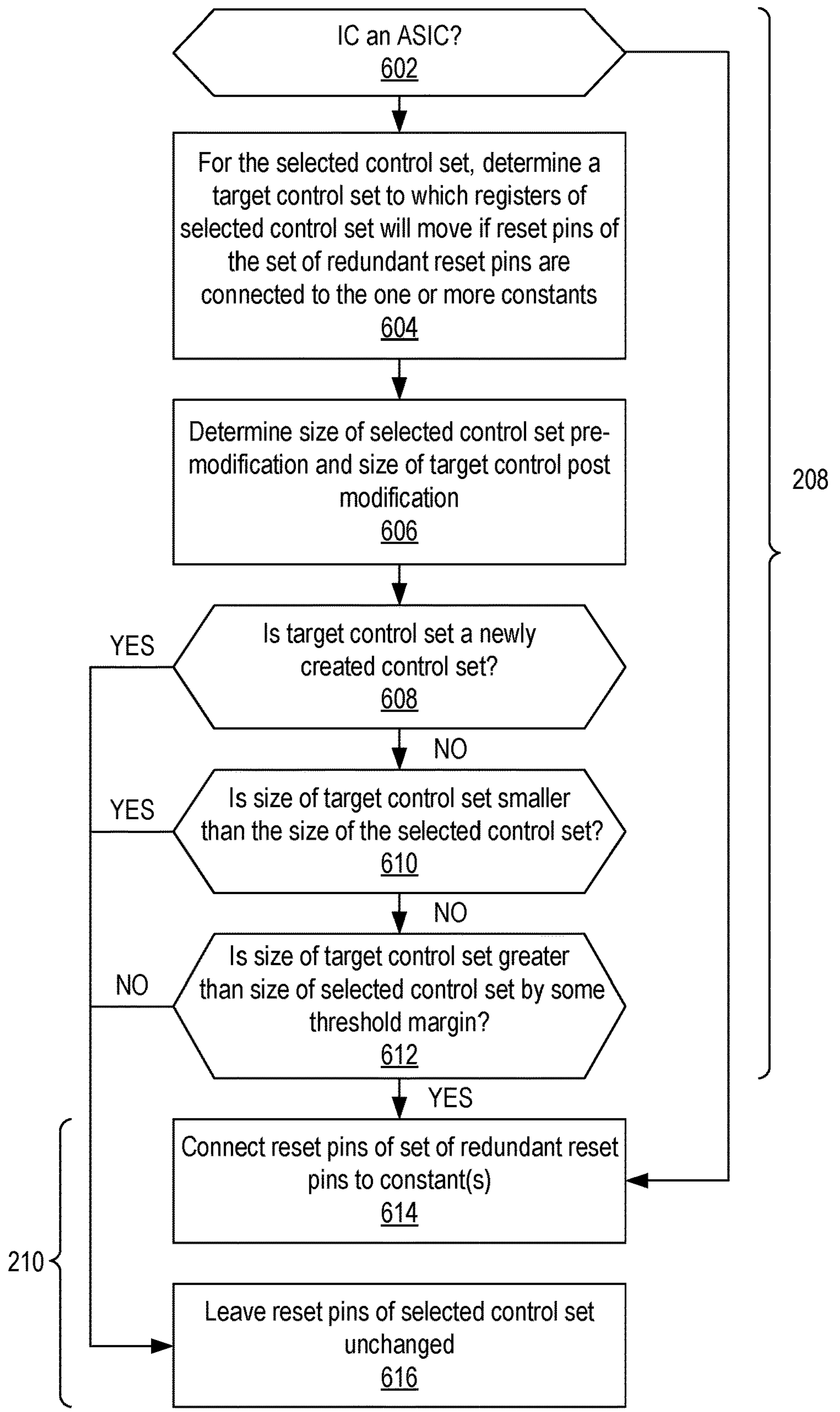
FIG. 6 illustrates an example implementation of the processing generally described in blocks 208 and 210 of FIG. 2.

FIG. 6 illustrates an example implementation of the processing performed by control set modifier 116 as generally described in blocks 208 and 210 of FIG. 2. In general, the operations described in connection with FIG. 6 determine whether a given reset pin of a register in a selected control set may be disconnected from a signal and tied to a constant of 0 or 1 (e.g., ground or VDD). Within this disclosure, it should be appreciated that connecting a given reset pin to a constant means that the reset pin is first disconnected from a signal and then connected to the constant. The operations illustrated in the example of FIG. 6 may be performed on an iterative basis for each control set of the circuit design.

In block 602, control set modifier 116 may determine whether the particular IC in which the circuit design is to be implemented is an ASIC. In response to determining that the IC is an ASIC, the method continues to block 614. As discussed, the heuristics need not be applied in the case where the circuit design is to be implemented in an ASIC. In response to determining that the IC is not an ASIC (e.g., the IC is a programmable IC such as an FPGA), the method continues to block 604.

In block 604, control set modifier 116, for the selected control set, determines a target control set to which registers of the selected control set will move or become members in the event that registers having reset pins belonging to the set of redundant reset pins 114 are connected to the one or more constants.

In block 606, control set modifier 116 determines the size of the selected control set as it exists pre-modification of the circuit design (e.g., prior to disconnecting and/or connecting of reset pins of registers of the selected control set). Control set modifier 116 also determines the size of the target control set post-modification of the circuit design. That is, control set modifier 116 determines the size of the target control set as if each register with a reset pin belonging to the set of redundant reset pins 114 is connected to the one or more constants. The size of a control set may be measured in terms of the number of registers belonging to, or that are members of, the control set. Thus, a given control set being smaller than another control set means that the control set has fewer or less members (e.g., registers) than the other control set.

In block 608, control set modifier 116 determines whether the target control set was an existing control set or would be a newly created control set (e.g., is a new control set). That is, in the event the registers with reset pins belonging to the set of redundant reset pins 114 are connected to the one or more constants, control set modifier 116 determines whether the resulting control set is a new control set (a control set created by virtue of the connection of the reset pins to the one or more constants) or one that already exists in the circuit design. For example, in the case where the target control set is newly created, the number of reset pins in the newly created control set will be the same as the number of reset pins in the set of redundant reset pins 114. In response to determining that the target control set would be a newly created control set (e.g., a new control set), the method continues to block 616, where the reset pins of the selected control set are left unchanged (e.g., remain connected to the signals and are not connected to any constant). Block 608 ensures that the number of control sets in the circuit design is not increased since increasing the number of control sets in the circuit design, at least in the case of a programmable IC, can degrade the QoR. In response to determining that the target control set is not a newly created control set, the method continues to block 610.

In block 610, control set modifier 116 determines whether the size of the target control set, as determined in block 606, is smaller than the size of the selected control set, as determined in block 606. In response to determining that the size of the target control set is smaller than the selected control set, the method continues to block 616 where the reset pins of the selected control set are left unchanged. In this case, moving registers from the selected control set to the target control set, at least with respect to a programmable IC, likely degrades QoR.

In block 612, control set modifier 116 determines whether the size of the target control set, as determined in block 606, is greater than the size of the selected control set, as determined in block 606, by a selected threshold margin. The threshold margin may be a specified or particular number of registers or may be expressed as a percentage of the number of registers in the selected control set. In one or more examples, the threshold margin may be a number or amount greater than zero. In one or more other examples, the threshold margin may be set to zero.

In response to determining that the size of the target control set is greater than the size of the selected control set by the threshold margin, the method continues to block 614. In response to determining that the size of the target control set is not greater than the size of the selected control set by the threshold margin, the method continues to block 616 where the reset pins of the selected control set are left unchanged.

Continuing to block 614, control set modifier 116 determines that the size of the target control set is greater than or equal to the size of the selected control set and does not exceed the threshold margin used in block 612. Accordingly, in block 614, for registers of the selected control having reset pins belonging to the set of redundant reset pins 114, control set modifier 116 connects the reset pins to the one or more constants.

In one or more other example implementation, the method includes connecting the reset pins of the registers of the first control set that belong to the set of redundant reset pins to the one or more constants only in response to determining that the number of registers of the second control set is greater than or equal to the number of registers of the first control set. For example, the threshold margin may or may not be utilized.

Having modified the circuit design as described, the resulting control set configuration will be QoR friendly. The circuit design, as modified, may then be placed and routed resulting in a physical realization of the circuit design in the IC with an improved QoR. The inventive arrangements are capable of detecting a larger number of registers having redundant set pins for a given circuit design thereby optimizing the control sets of the circuit design to a greater extent than conventional ODC-based techniques. The resulting QoR of the circuit design as realized in an IC is thereby improved (e.g., in terms of improved timing and improved IC resource utilization).

Figure 7:
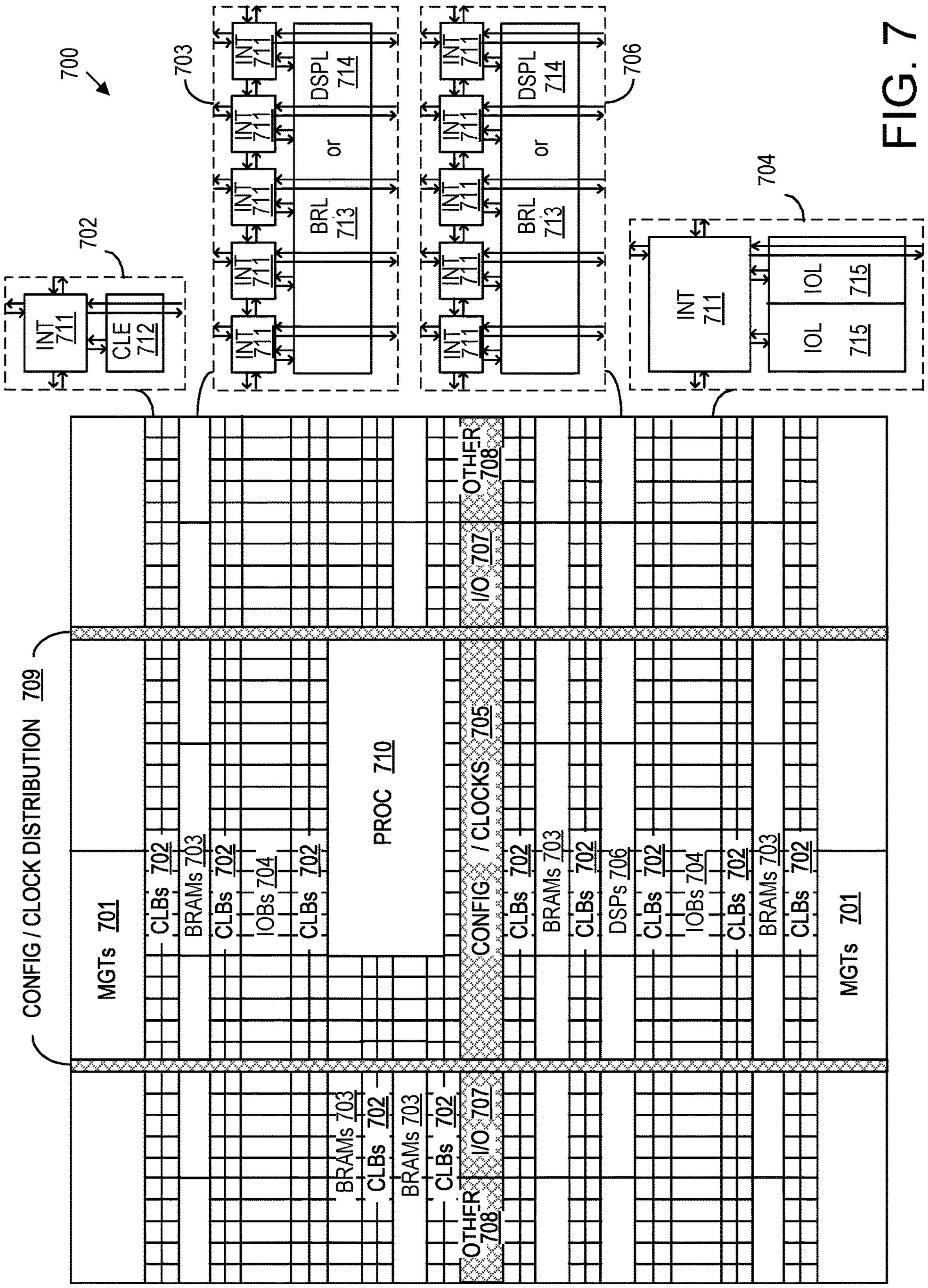
FIG. 7 illustrates an example architecture for an IC.

FIG. 7 illustrates an example architecture 700 for an IC. In one aspect, architecture 700 may be implemented within a programmable IC. For example, architecture 700 may be used to implement an FPGA. Architecture 700 may also be representative of a system-on-chip (SOC) type of IC. An SOC is an IC that includes a processor that executes program code and one or more other circuits. The other circuits may be implemented as hardwired circuitry, programmable circuitry, and/or a combination thereof. The circuits may operate cooperatively with one another and/or with the processor.

As shown, architecture 700 includes several different types of programmable circuit, e.g., logic, blocks. For example, architecture 700 may include a large number of different programmable tiles including multi-gigabit transceivers (MGTs) 701, configurable logic blocks (CLBs) 702, random access memory blocks (BRAMs) 703, input/output blocks (IOBs) 704, configuration and clocking logic (CONFIG/CLOCKS) 705, digital signal processing blocks (DSPs) 706, specialized I/O blocks 707 (e.g., configuration ports and clock ports), and other programmable logic 708 such as digital clock managers, analog-to-digital converters, system monitoring logic, and so forth.

In some ICs, each programmable tile includes a programmable interconnect element (INT) 711 having standardized connections to and from a corresponding INT 711 in each adjacent tile. Therefore, INTs 711, taken together, implement the programmable interconnect structure for the illustrated IC. Each INT 711 also includes the connections to and from the programmable logic element within the same tile, as shown by the examples included at the top of FIG. 7.

For example, a CLB 702 may include a configurable logic element (CLE) 712 that may be programmed to implement user logic plus a single INT 711. A BRAM 703 may include a BRAM logic element (BRL) 713 in addition to one or more INTs 711. Typically, the number of INTs 711 included in a tile depends on the height of the tile. As pictured, a BRAM tile has the same height as five CLBs, but other numbers (e.g., four) also may be used. A DSP tile 706 may include a DSP logic element (DSPL) 714 in addition to an appropriate number of INTs 711. An IOB 704 may include, for example, two instances of an I/O logic element (IOL) 715 in addition to one instance of an INT 711. The actual I/O pads connected to IOL 715 may not be confined to the area of IOL 715.

In the example pictured in FIG. 7, a columnar area near the center of the die, e.g., formed of regions 705, 707, and 708, may be used for configuration, clock, and other control logic. Horizontal areas 709 extending from this column may be used to distribute the clocks and configuration signals across the breadth of the programmable IC.

Some ICs utilizing the architecture illustrated in FIG. 7 include additional logic blocks that disrupt the regular columnar structure making up a large part of the IC. The additional logic blocks may be programmable blocks and/or dedicated circuitry. For example, a processor block depicted as PROC 710 spans several columns of CLBs and BRAMs.

In one aspect, PROC 710 may be implemented as dedicated circuitry, e.g., as a hardwired processor, that is fabricated as part of the die that implements the programmable circuitry of the IC. PROC 710 may represent any of a variety of different processor types and/or systems ranging in complexity from an individual processor, e.g., a single core capable of executing program code, to an entire processor system having one or more cores, modules, co-processors, interfaces, or the like.

In another aspect, PROC 710 may be omitted from architecture 700 and replaced with one or more of the other varieties of the programmable blocks described. Further, such blocks may be utilized to form a "soft processor" in that the various blocks of programmable circuitry may be used to form a processor that can execute program code as is the case with PROC 710.

The phrase "programmable circuitry" means circuitry used to rebuild reconfigurable digital circuits. With reference to FIG. 7, the programmable circuitry refers to the programmable circuit elements (e.g., the programmable or configurable circuit blocks or tiles described herein and the interconnect circuitry that selectively couples the various circuit blocks, tiles, and/or elements according to configuration data that is loaded into the IC). For example, circuit blocks shown in FIG. 7 that are external to PROC 710 such as CLBs 702 and BRAMs 703 are considered programmable circuitry of the IC.

In general, the functionality of programmable circuitry is not established until configuration data is loaded into the IC. A set of configuration bits may be used to program programmable circuitry of an IC such as an FPGA. The configuration bit(s) typically are referred to as a "configuration bitstream" or "configuration data." In general, programmable circuitry is not operational or functional without first loading a configuration bitstream into the IC. The configuration bitstream effectively implements a particular circuit design within the programmable circuitry. The circuit design specifies, for example, functional aspects of the programmable circuit blocks and physical connectivity among the various programmable circuit blocks.

Circuitry that is "hardwired" or "hardened," i.e., not programmable, is manufactured as part of the IC. Unlike programmable circuitry, hardwired circuitry or circuit blocks are not implemented after the manufacture of the IC through the loading of a configuration bitstream. Hardwired circuitry is generally considered to have dedicated circuit blocks and interconnects, for example, that are functional without first loading a configuration bitstream into the IC, e.g., PROC 710.

In some instances, hardwired circuitry may have one or more operational modes that can be set or selected according to register settings or values stored in one or more memory elements within the IC. The operational modes may be set, for example, through the loading of a configuration bitstream into the IC. Despite this ability, hardwired circuitry is not considered programmable circuitry as the hardwired circuitry is operable and has a particular function when manufactured as part of the IC.

In the case of an SOC, the configuration bitstream may specify the circuitry that is to be implemented within the programmable circuitry and the program code that is to be executed by PROC 710 or a soft processor. In some cases, architecture 700 includes a dedicated configuration processor that loads the configuration bitstream to the appropriate configuration memory and/or processor memory. The dedicated configuration processor does not execute user-specified program code. In other cases, architecture 700 may utilize PROC 710 to receive the configuration bitstream, load the configuration bitstream into appropriate configuration memory, and/or extract program code for execution.

FIG. 7 is intended to illustrate an example architecture that may be used to implement an IC that includes programmable circuitry, e.g., a programmable fabric. For example, the number of logic blocks in a column, the relative width of the columns, the number and order of columns, the types of logic blocks included in the columns, the relative sizes of the logic blocks, and the interconnect/logic implementations included at the top of FIG. 7 are purely illustrative. In an actual IC, for example, more than one adjacent column of CLBs is typically included wherever the CLBs appear, to facilitate the efficient implementation of a user circuit design. The number of adjacent CLB columns, however, may vary with the overall size of the IC. Further, the size and/or positioning of blocks such as PROC 710 within the IC are for purposes of illustration only and are not intended as limitations. Architecture 700 may be adapted such that the programmable circuitry/logic is a portion of a larger IC with one or more other subsystems included therein.

Figure 8:
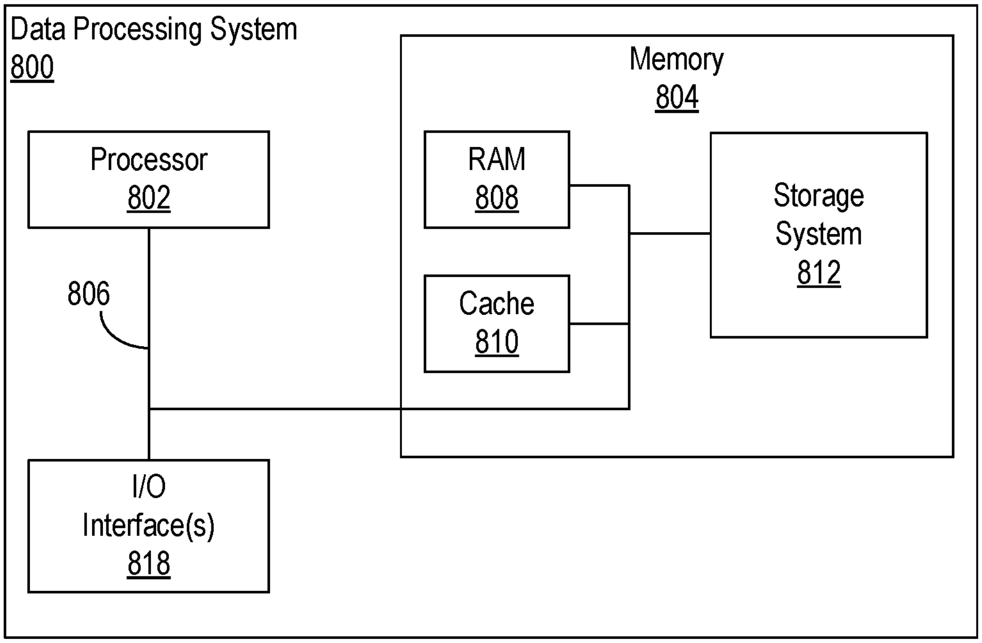
FIG. 8 illustrates an example implementation of a data processing system.

FIG. 8 illustrates an example implementation of a data processing system 800. As defined herein, the term "data processing system" means one or more hardware systems configured to process data, each hardware system including at least one processor and memory, wherein the processor is programmed with computer-readable instructions that, upon execution, initiate operations. Data processing system 800 can include a processor 802, a memory 804, and a bus 806 that couples various system components including memory 804 to processor 802.

Processor 802 may be implemented as one or more processors. In an example, processor 802 is implemented as a central processing unit (CPU). Processor 802 may be implemented as one or more circuits, e.g., hardware, capable of carrying out instructions contained in program code. The circuit may be an integrated circuit or embedded in an integrated circuit. Processor 802 may be implemented using a complex instruction set computer architecture (CISC), a reduced instruction set computer architecture (RISC), a vector processing architecture, or other known architectures. Example processors include, but are not limited to, processors having an x86 type of architecture (IA-32, IA-64, etc.), Power Architecture, ARM processors, and the like.

Bus 806 represents one or more of any of a variety of communication bus structures. By way of example, and not limitation, bus 806 may be implemented as a Peripheral Component Interconnect Express (PCIe) bus. Data processing system 800 typically includes a variety of computer system readable media. Such media may include computer-readable volatile and non-volatile media and computer-readable removable and non-removable media.

Memory 804 can include computer-readable media in the form of volatile memory, such as random-access memory (RAM) 808 and/or cache memory 810. Data processing system 800 also can include other removable/non-removable, volatile/non-volatile computer storage media. By way of example, storage system 812 can be provided for reading from and writing to a non-removable, non-volatile magnetic and/or solid-state media (not shown and typically called a "hard drive"), which may be included in storage system 812. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 806 by one or more data media interfaces. Memory 804 is an example of at least one computer program product.

Memory 804 is capable of storing computer-readable program instructions that are executable by processor 802. For example, the computer-readable program instructions can include an operating system, one or more application programs, other program code, and program data. The computer-readable program code, upon execution, causes data processing system 800 (e.g., processor 802) to perform the operations described herein.

It should be appreciated that data items used, generated, and/or operated upon by data processing system 800 are functional data structures that impart functionality when employed by data processing system 800. As defined within this disclosure, the term "data structure" means a physical implementation of a data model's organization of data within a physical memory. As such, a data structure is formed of specific electrical or magnetic structural elements in a memory. A data structure imposes physical organization on the data stored in the memory as used by an application program executed using a processor.

Data processing system 800 may include one or more Input/Output (I/O) interfaces 818 communicatively linked to bus 806. I/O interface(s) 818 allow data processing system 800 to communicate with one or more external devices and/or communicate over one or more networks such as a local area network (LAN), a wide area network (WAN), and/or a public network (e.g., the Internet). Examples of I/O interfaces 818 may include, but are not limited to, network cards, modems, network adapters, hardware controllers, etc. Examples of external devices also may include devices that allow a user to interact with data processing system 800 (e.g., a display, a keyboard, and/or a pointing device) and/or other devices such as accelerator card.

Data processing system 800 is only one example implementation. Data processing system 800 can be practiced as a standalone device (e.g., as a user computing device or a server, as a bare metal server), in a cluster (e.g., two or more interconnected computers), or in a distributed cloud computing environment (e.g., as a cloud computing node) where tasks are performed by remote processing devices that are linked through a communications network. In a distributed cloud computing environment, program modules may be located in both local and remote computer system storage media including memory storage devices.

The example of FIG. 8 is not intended to suggest any limitation as to the scope of use or functionality of example implementations described herein. Data processing system 800 is an example of computer hardware that is capable of performing the various operations described within this disclosure. In this regard, data processing system 800 may include fewer components than shown or additional components not illustrated in FIG. 8 depending upon the particular type of device and/or system that is implemented. The particular operating system and/or application(s) included may vary according to device and/or system type as may the types of I/O devices included. Further, one or more of the illustrative components may be incorporated into, or otherwise form a portion of, another component. For example, a processor may include at least some memory.

The terminology used herein is for the purpose of describing particular embodiments only and is not intended to be limiting. Notwithstanding, several definitions that apply throughout this document are expressly defined as follows.

As defined herein, the singular forms "a," "an," and "the" are intended to include the plural forms as well, unless the context clearly indicates otherwise.

As defined herein, the term "automatically" means without human intervention.

As defined herein, the term "computer-readable storage medium" means a storage medium that contains or stores program instructions for use by or in connection with an instruction execution system, apparatus, or device. As defined herein, a "computer-readable storage medium" is not a transitory, propagating signal per se. The various forms of memory, as described herein, are examples of computer-readable storage media. A non-exhaustive list of examples of computer-readable storage media include an electronic storage device, a magnetic storage device, an optical storage device, an electromagnetic storage device, a semiconductor storage device, or any suitable combination of the foregoing. A non-exhaustive list of more specific examples of a computer-readable storage medium may include: a portable computer diskette, a hard disk, a RAM, a read-only memory (ROM), an erasable programmable read-only memory (EPROM or Flash memory), an electronically erasable programmable read-only memory (EEPROM), a static random-access memory (SRAM), a portable compact disc read-only memory (CD-ROM), a digital versatile disk (DVD), a memory stick, a floppy disk, or the like.

As defined herein, the term "responsive to" and similar language as described above, e.g., "if," "when," or "upon," means responding or reacting readily to an action or event. The response or reaction is performed automatically. Thus, if a second action is performed "responsive to" a first action, there is a causal relationship between an occurrence of the first action and an occurrence of the second action. The term "responsive to" indicates the causal relationship.

As defined herein, the terms "individual" and "user" each refer to a human being.

As defined herein, the term "hardware processor" means at least one hardware circuit. The hardware circuit may be configured to carry out instructions contained in program code. The hardware circuit may be an integrated circuit. Examples of a hardware processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the terms "one embodiment," "an embodiment," "in one or more embodiments," "in particular embodiments," or similar language mean that a particular feature, structure, or characteristic described in connection with the embodiment is included in at least one embodiment described within this disclosure. Thus, appearances of the aforementioned phrases and/or similar language throughout this disclosure may, but do not necessarily, all refer to the same embodiment.

As defined herein, the term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

The terms first, second, etc. may be used herein to describe various elements. These elements should not be limited by these terms, as these terms are only used to distinguish one element from another unless stated otherwise or the context clearly indicates otherwise.

A computer program product may include a computer-readable storage medium (or media) having computer-readable program instructions thereon for causing a processor to carry out aspects of the inventive arrangements described herein. Within this disclosure, the term "program code" is used interchangeably with the term "program instructions." Computer-readable program instructions described herein may be downloaded to respective computing/processing devices from a computer-readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object-oriented programming language and/or procedural programming languages. Computer-readable program instructions may include state-setting data. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer-readable program instructions by utilizing state information of the computer-readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer-readable program instructions, e.g., program code.

These computer-readable program instructions may be provided to a processor of a computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the operations specified in the flowchart and/or block diagram block or blocks.

The computer-readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowchart or block diagrams may represent a module, segment, or portion of instructions, which comprises one or more executable instructions for implementing the specified operations.

In some alternative implementations, the operations noted in the blocks may occur out of the order noted in the figures. For example, two blocks shown in succession may be executed substantially concurrently, or the blocks may sometimes be executed in the reverse order, depending upon the functionality involved. In other examples, blocks may be performed generally in increasing numeric order while in still other examples, one or more blocks may be performed in varying order with the results being stored and utilized in subsequent or other blocks that do not immediately follow. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:

generating, by a processor, Observability Don't Care (ODC) expressions for registers of a circuit design;

determining, by the processor, a set of redundant reset pins of the registers of the circuit design by iteratively checking, on a per-cube and a per-literal basis for each ODC expression, whether a value of a literal causes the ODC expression to evaluate to 1; and generating, by the processor, a modified version of the circuit design by connecting one or more reset pins of the set of redundant reset pins to one or more constants.

2. The method of claim 1, wherein the iteratively checking, on the per-cube and per-literal basis for each ODC expression, whether the value of the literal causes the ODC expression to evaluate to 1 further comprises:

first determining that the literal is compatible with the register of the ODC expression being processed.

3. The method of claim 1, wherein the determining the redundant reset pins of the registers of the circuit design further comprises:

for each ODC expression, sorting cubes of the ODC expression from largest to smallest; and determining whether the ODC expression evaluates to one by checking the literals of the cubes as sorted one-by-one.

4. The method of claim 3, wherein the determining the redundant reset pins of the registers of the circuit design further comprises:

in response to determining that a selected literal of a selected cube of a selected ODC expression causes the selected ODC expression to evaluate to 1 and that a further ODC expression is available to process, selecting the further ODC expression for evaluating the literals thereof.

5. The method of claim 1, wherein the generating the modified circuit design comprises:

for reset pins of registers of a first control set that belong to the set of redundant reset pins, determining whether connecting the reset pins to the one or more constants creates a new control set; and in response to determining that the new control set is created, leaving the reset pins of the first control set unchanged.

6. The method of claim 1, wherein the generating the modified circuit design comprises:

determining a number of registers belonging to a first control set;

determining a number of registers belonging to a second control set if reset pins of registers of the first control set belonging to the set of redundant reset pins were connected to the one or more constants, wherein the second control set is an existing control set of the circuit design; and leaving the reset pins of the registers of the first control set unchanged in response to determining that the number of registers of the second control set is less than the number of registers of the first control set.

7. The method of claim 1, wherein the generating the modified circuit design comprises:

determining a number of registers belonging to a first control set;

determining a number of registers belonging to a second control set if reset pins of registers of the first control set belonging to the set of redundant reset pins were connected to the one or more constants, wherein the second control set is an existing control set of the circuit design; and connecting the reset pins of the registers of the first control set that belong to the set of redundant reset pins to the one or more constants only in response to determining that the number of registers of the second control set is greater than the number of registers of the first control set by at least a threshold margin.

8. The method of claim 1, wherein the generating the modified circuit design comprises:

determining a number of registers belonging to a first control set;

determining a number of registers belonging to a second control set if reset pins of registers of the first control set belonging to the set of redundant reset pins were connected to the one or more constants, wherein the second control set is an existing control set of the circuit design; and connecting the reset pins of the registers of the first control set that belong to the set of redundant reset pins to the one or more constants only in response to determining that the number of registers of the second control set is greater than or equal to the number of registers of the first control set.

9. The method of claim 1, wherein a selected register of the circuit design is synchronous and at least one literal of the ODC expression for the selected register corresponds to an asynchronous register.

10. A system, comprising:

one or more hardware processors configured to execute operations including:

generating Observability Don't Care (ODC) expressions for registers of a circuit design;

determining a set of redundant reset pins of the registers of the circuit design by iteratively checking, on a per-cube and a per-literal basis for each ODC expression, whether a value of a literal causes the ODC expression to evaluate to 1; and generating a modified version of the circuit design by connecting one or more reset pins of the set of redundant reset pins to one or more constants.

11. The system of claim 10, wherein the iteratively checking, on the per-cube and per-literal basis for each ODC expression, whether the value of the literal causes the ODC expression to evaluate to 1 further comprises:

first determining that the literal is compatible with the register of the ODC expression being processed.

12. The system of claim 10, wherein the determining the redundant reset pins of the registers of the circuit design further comprises:

for each ODC expression, sorting cubes of the ODC expression from largest to smallest; and determining whether the ODC expression evaluates to 1 by checking the literals of the cubes as sorted one-by-one.

13. The system of claim 12, wherein the determining the redundant reset pins of the registers of the circuit design further comprises:

in response to determining that a selected literal of a selected cube of a selected ODC expression causes the selected ODC expression to evaluate to 1 and that a further ODC expression is available to process, selecting the further ODC expression for evaluating the literals thereof.

14. The system of claim 10, wherein the generating the modified circuit design comprises:

for reset pins of registers of a first control set that belong to the set of redundant reset pins, determining whether connecting the reset pins to the one or more constants creates a new control set; and in response to determining that the new control set is created, leaving the reset pins of the first control set unchanged.

15. The system of claim 10, wherein the generating the modified circuit design comprises:

determining a number of registers belonging to a first control set;

determining a number of registers belonging to a second control set if reset pins of registers of the first control set belonging to the set of redundant reset pins were connected to the one or more constants, wherein the second control set is an existing control set of the circuit design; and leaving the reset pins of the registers of the first control set unchanged in response to determining that the number of registers of the second control set is less than the number of registers of the first control set.

16. The system of claim 10, wherein the generating the modified circuit design comprises:

determining a number of registers belonging to a first control set;

determining a number of registers belonging to a second control set if reset pins of registers of the first control set belonging to the set of redundant reset pins were connected to the one or more constants, wherein the second control set is an existing control set of the circuit design; and connecting the reset pins of the registers of the first control set that belong to the set of redundant reset pins to the one or more constants only in response to determining that the number of registers of the second control set is greater than the number of registers of the first control set by at least a threshold margin.

17. The system of claim 10, wherein the generating the modified circuit design comprises:

determining a number of registers belonging to a first control set;

determining a number of registers belonging to a second control set if reset pins of registers of the first control set belonging to the set of redundant reset pins were connected to the one or more constants, wherein the second control set is an existing control set of the circuit design; and connecting the reset pins of the registers of the first control set that belong to the set of redundant reset pins to the one or more constants only in response to determining that the number of registers of the second control set is greater than or equal to the number of registers of the first control set.

18. The system of claim 10, wherein a selected register of the circuit design is synchronous and at least one literal of the ODC expression for the selected register corresponds to an asynchronous register.

19. A computer program product comprising one or more computer readable storage mediums having program instructions embodied therewith, wherein the program instructions are executable by computer hardware to cause the computer hardware to initiate executable operations comprising:

generating Observability Don't Care (ODC) expressions for registers of a circuit design;

determining a set of redundant reset pins of the registers of the circuit design by iteratively checking, on a per-cube and a per-literal basis for each ODC expression, whether a value of a literal causes the ODC expression to evaluate to 1; and generating a modified version of the circuit design by connecting one or more reset pins of the set of redundant reset pins to one or more constants.

20. The computer program product of claim 19, wherein the iteratively checking, on the per-literal basis and for each ODC expression, whether the value of the literal causes the ODC expression to evaluate to 1 further comprises:

first determining that the literal is compatible with the register of the ODC expression being processed.

* * * * *